(12) United States Patent
Branson et al.

(10) Patent No.: US 8,413,141 B2
(45) Date of Patent: Apr. 2, 2013

(54) COPYING SEGMENTS OF VIRTUAL RESOURCE DEFINITION TO CREATE AND DEPLOY A VIRTUAL RESOURCE ON A PHYSICAL RESOURCE

(75) Inventors: Michael John Branson, Rochester, MN (US); Gregory Richard Hintermeister, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 654 days.

(21) Appl. No.: 12/428,655

(22) Filed: Apr. 23, 2009

(65) Prior Publication Data

US 2010/0275202 A1   Oct. 28, 2010

(51) Int. Cl.
*G06F 9/455*   (2006.01)
*G06F 9/46*    (2006.01)

(52) U.S. Cl. .............................. 718/1; 718/102; 718/104
(58) Field of Classification Search .................. None
See application file for complete search history.

(56) References Cited

U.S. PATENT DOCUMENTS

| | | | | |
|---|---|---|---|---|
| 7,356,679 B1 * | 4/2008 | Le et al. | | 713/1 |
| 7,577,722 B1 * | 8/2009 | Khandekar et al. | | 709/220 |
| 2006/0155735 A1 * | 7/2006 | Traut et al. | | 707/101 |
| 2006/0195715 A1 * | 8/2006 | Herington | | 714/4 |
| 2007/0089111 A1 * | 4/2007 | Robinson et al. | | 718/1 |
| 2007/0214455 A1 * | 9/2007 | Williams et al. | | 718/1 |
| 2007/0250833 A1 * | 10/2007 | Araujo et al. | | 718/1 |
| 2007/0300221 A1 * | 12/2007 | Hartz et al. | | 718/1 |
| 2008/0163210 A1 * | 7/2008 | Bowman et al. | | 718/1 |
| 2009/0172662 A1 * | 7/2009 | Liu | | 718/1 |
| 2009/0210858 A1 * | 8/2009 | Son et al. | | 717/121 |

* cited by examiner

*Primary Examiner* — Jennifer To
*Assistant Examiner* — Tammy Lee
(74) *Attorney, Agent, or Firm* — Martin & Associates LLC; Bret J. Petersen

(57) ABSTRACT

The disclosure and claims herein are directed to copying segments of a virtual resource definition from an existing virtual resource to create a new virtual resource definition or modifying an existing one to simplify virtualization management. The virtualization manager divides a virtual resource definition into a number of reusable segments. A user may then select one or more segments and place them into a new or existing virtual resource definition. The user can choose to mix and match segments to quickly create or modify a virtual resource definition such as a virtual server, virtual printer or virtual data storage. Any default information in the new virtual resource or old information in the existing resource is replaced by the information in the copied segment. Any dependencies in the existing virtual resource are resolved with user input to break the dependencies or copy dependent data.

18 Claims, 5 Drawing Sheets

COPYING SEGMENTS OF VIRTUAL RESOURCE DEFINITION TO CREATE AND DEPLOY A VIRTUAL RESOURCE ON A PHYSICAL RESOURCE

BACKGROUND

1. Technical Field

This disclosure generally relates to virtualization of computer resources and virtual resource managers, and more specifically relates to copying segments of an existing virtual resource to another virtual resource definition to simplify virtualization management.

2. Background Art

Many companies and organizations must maintain a substantial information technology (IT) infrastructure that comprises a large number of computer resources including data servers integrated together. The data servers and other computer resources are often maintained using server management software such as the Systems Director 6.1 by International Business Machines Corporation (IBM). Using server management tools such as IBM's Systems Director 6.1, systems administrators can manage a large number of physical and virtual resources on multiple platforms and operating systems.

A virtual resource is a resource such as a virtual server, virtual disk drive or virtual printer. These virtual resources are deployed on a physical resource. Virtualization of these resources is used to improve the efficiency and availability of the physical resources. Multiple virtual machines with different operating systems can be run on a single physical machine. Thus a virtual server is simply a server that is deployed in virtual environment. The virtual server may be deployed with other virtual servers on a single physical machine.

Server management tools, such as that described above, typically employ a virtualization manager to create and manage images and virtual system definitions (or templates) to expedite the process of creating and deploying virtual servers. The virtualization manager allows system administrators to manage system definitions that meet specific hardware and software requirements. They can copy and customize existing images of virtual servers to create new virtual servers based on an existing virtual server definition (or template).

Even with the new tools for managing resources, virtualization management is complex and can be time consuming. New ways for simplifying virtualization management and making the task more intuitive is extremely helpful for the system administrator. Without a way to more efficiently and simply create and manage virtualization tasks of creating virtual resources, system administrators will continue to suffer from inefficient management of virtual resources using virtualization management tools.

BRIEF SUMMARY

The disclosure and claims herein are directed to copying segments of a virtual resource definition from an existing virtual resource to create a new virtual resource definition or modifying an existing one to simplify virtualization management. The virtualization manager divides a virtual resource definition into a number of reusable segments. A user may then select one or more segments and place them into a new or existing virtual resource definition. The user can choose to mix and match segments to quickly create or modify a virtual resource definition such as a virtual server, virtual printer or virtual data storage. Any default information in the new virtual resource or old information in the existing resource is replaced by the information in the copied segment. Any dependencies in the existing virtual resource are resolved with user input to break the dependencies or copy dependent data.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

DETAILED DESCRIPTION

The disclosure and claims herein are directed to copying segments of a virtual resource definition from an existing virtual resource to create a new virtual resource definition or modifying an existing one to simplify virtualization management. The virtualization manager divides a virtual resource definition into a number of reusable segments. A user may then select one or more segments and place them into a new or existing virtual resource definition. Any default information in the new virtual resource or old information in the existing resource is replaced by the information in the copied segment. Any dependencies in the existing virtual resource are resolved with user input to break the dependencies or copy dependent data.

Figure 1:
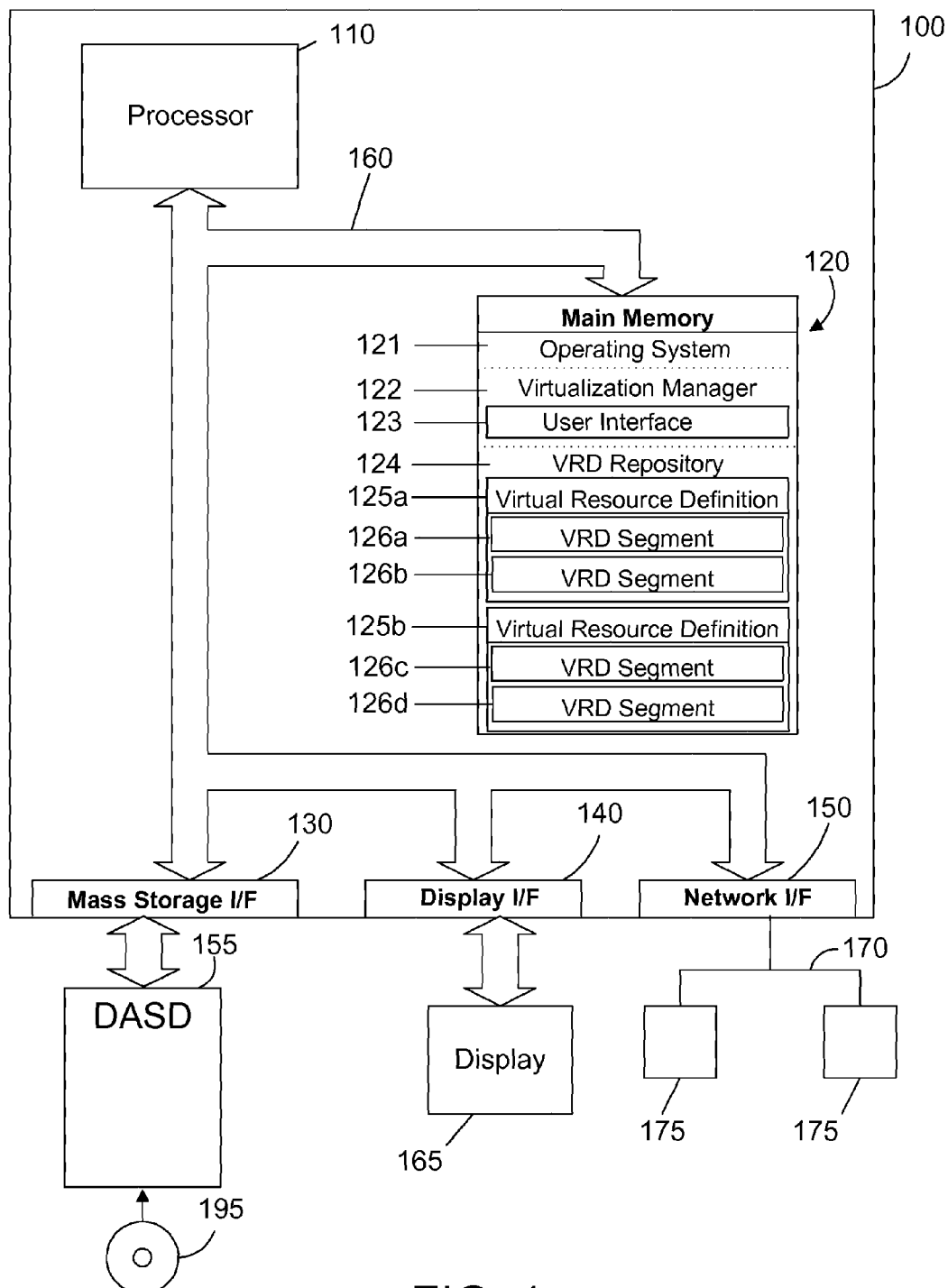
FIG. 1 is a block diagram of a computer system with a virtualization manager to simplify creating virtual resource definitions as described herein.

Referring to FIG. 1, a computer system 100 is one suitable implementation of a computer system that includes a virtualization manager as described herein. Computer system 100 is an IBM iSeries computer system. However, those skilled in the art will appreciate that the disclosure herein applies equally to any computer system, regardless of whether the computer system is a complicated multi-user computing apparatus, a single user workstation, or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as direct access storage devices 155, to computer system 100. One specific type of direct access storage device 155 is a readable and writable CD-RW drive, which may store data to and read data from a CD-RW 195.

Main memory 120 preferably contains an operating system 121. Operating system 121 is a multitasking operating system known in the industry as i5/OS; however, those skilled in the art will appreciate that the spirit and scope of this disclosure is not limited to any one operating system. The memory further includes a virtualization manager 122 that preferably includes a user interface 123. The memory further contains a virtual resource definition (VRD) repository 124. The VRD depository 124 includes one or more virtual resource definitions 125a, 125b. Each of the virtual resource definitions 125 include one or more VRD segments 126 a-126d. Each of these entities in memory is described further below.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while operating system 121, virtualization manager 122, user interface 123, VRD depository 124, and virtual resource definitions 125a, 125b are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 121 and later executes the program instructions that make up the virtualization manager 122.

Although computer system 100 is shown to contain only a single processor and a single system bus, those skilled in the art will appreciate that a virtualization manager may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect computer system 100 to other computer systems or workstations 175 via network 170. Network interface 150 broadly represents any suitable way to interconnect electronic devices, regardless of whether the network 170 comprises present-day analog and/or digital techniques or via some networking mechanism of the future. In addition, many different network protocols can be used to implement a network. These protocols are specialized computer programs that allow computers to communicate across a network. TCP/IP (Transmission Control Protocol/Internet Protocol) is an example of a suitable network protocol.

At this point, it is important to note that while the description above is in the context of a fully functional computer system, those skilled in the art will appreciate that the journal mechanism described herein may be distributed as an article of manufacture in a variety of forms, and the claims extend to all suitable types of computer-readable media used to actually carry out the distribution, including recordable media such as floppy disks and CD-RW (e.g., 195 of FIG. 1).

Embodiments herein may also be delivered as part of a service engagement with a client corporation, nonprofit organization, government entity, internal organizational structure, or the like. These embodiments may include configuring a computer system to perform some or all of the methods described herein, and deploying software, hardware, and web services that implement some or all of the methods described herein.

The claims and disclosure herein are directed to a virtualization manager that allows a systems administrator to simplify virtualization management. The virtualization manager allows the system administrator to create or modify a virtual resource definition using one or more segments of an existing virtual resource definition. As used herein, the term virtual resource may apply to any virtual computer system resource such as a virtual server, virtual data storage device, virtual printer, etc. A virtual resource definition (VRD) is used to describe a virtual resource instance on a physical resource. A virtual resource definition has one or more elements that are parameters or properties that define the virtual resource depending on the type of virtual resource. As used herein, the term VRD segment refers to one or more of these virtual resource elements associated with a virtual resource. The virtualization manager logically divides the virtual resources into a number of segments such that the segments contain a number of related parameters or properties of the physical resource. Thus, where the segment contains more than one virtual resource element, the multiple resource elements are logically related to each other and are used in combination to define the physical resource. A sub-segment is one or more of these segment elements that can be copied as a unit as described below.

Figure 2:
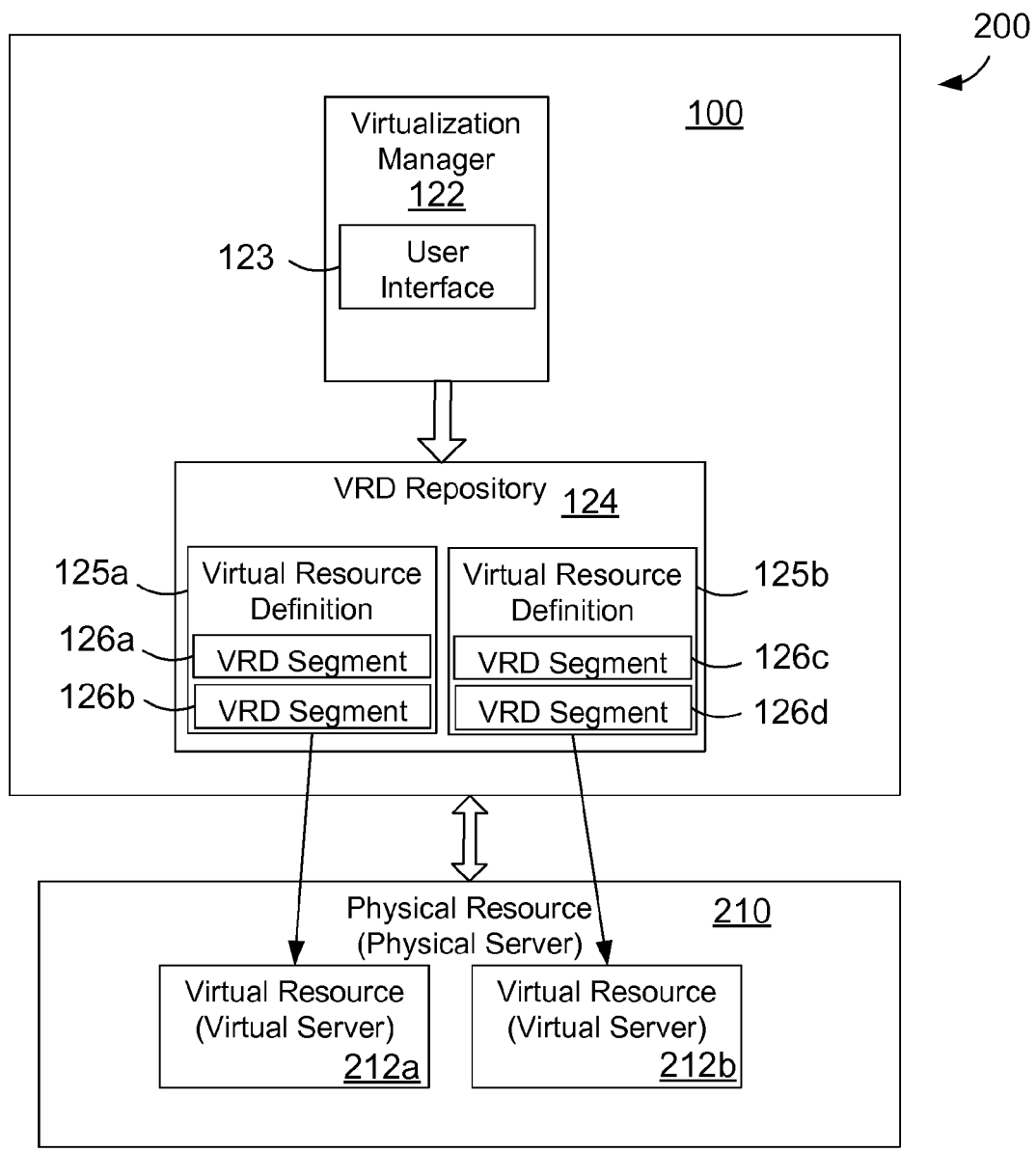
FIG. 2 is a more detailed block diagram of the virtualization manager in the computer system in conjunction with the related physical and virtual resources described by the virtual resource definitions.

FIG. 2 illustrates a block diagram of the virtualization manager 122 in the computer system 100 as described above with reference to FIG. 1. The virtualization manager 122 includes a user interface 123 that allows a systems administrator to create virtual resource definitions 125a, 125b that are stored in a VRD repository 124. The virtual resource definitions include one or more VRD segments 126a-d. Each of the virtual resource definitions corresponds to a related virtual resource 212a,b located on a physical resource 210. In the illustrated example, virtual resource definition 125a defines a virtual resource 212a, and virtual resource definition 125b defines a virtual resource 212b. In this example we assume that virtual resource definition 125a and 125b each describe a virtual server 212a and 212b. These virtual servers 212a and 212b are both deployed on a single physical server 210 in the manner known in the prior art. Similarly, the virtual resources could be located on different physical resources (not shown).

Figure 3:
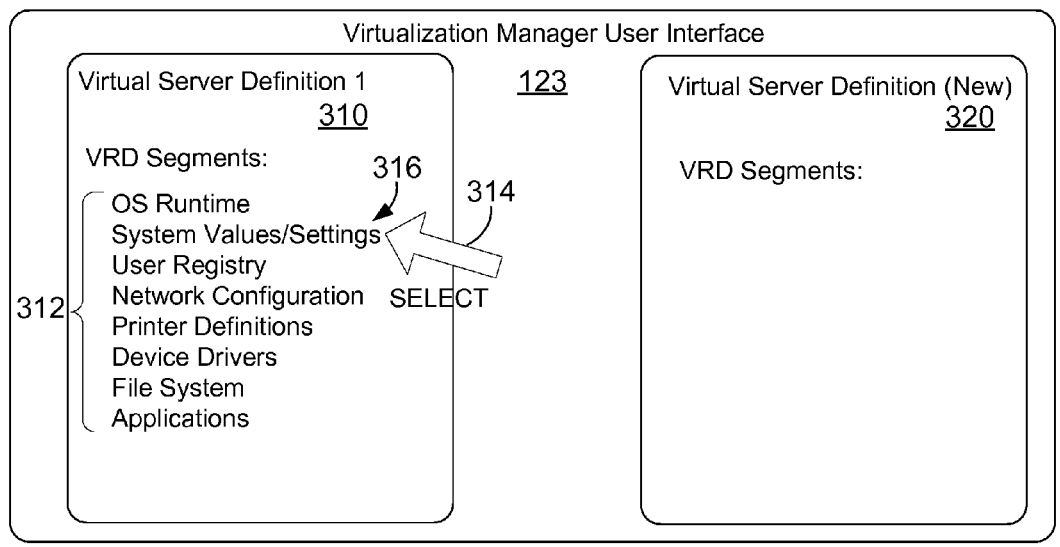
FIG. 3 illustrates a virtual resource definition divided into segments.
Figure 4:
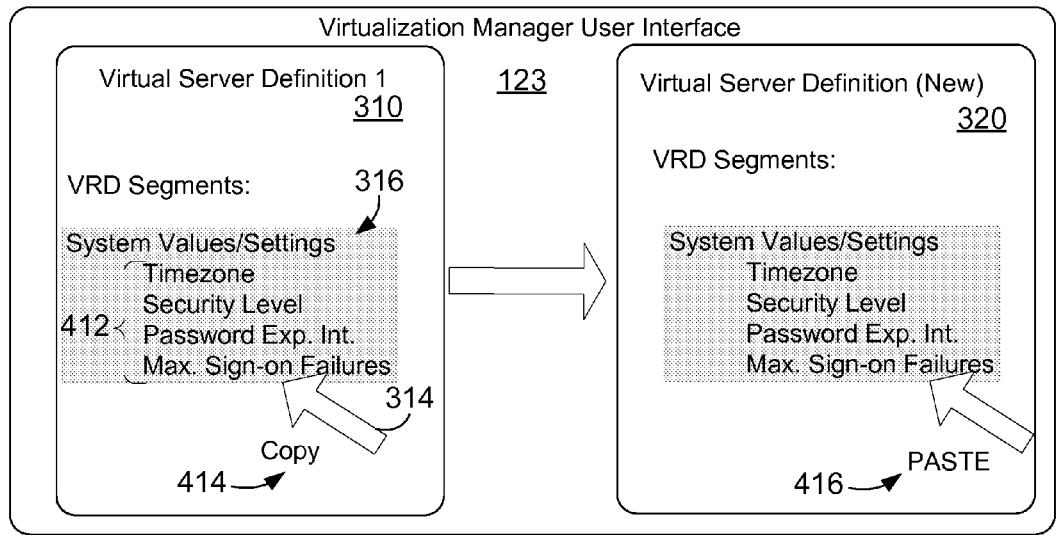
FIG. 4 illustrates an example of creating a virtual resource definition using segments from an existing virtual resource definition.

FIGS. 3 and 4 together illustrate an example of creating a virtual resource definition (VRD) using one or more segments of an existing virtual resource definition. FIG. 3 illustrates a simplified representation of a graphical user interface 123 of the virtualization manager (122 in FIG. 2). In FIG. 3, the user interface 123 displays an existing virtual resource definition 310 and a new virtual resource definition 320 that will be used to create a new virtual server. The existing virtual resource definition 310 may define an existing virtual server (not shown) or be an existing server definition template. In this example, the new virtual resource definition 320 is simply a shell without any VRD segments defined. In contrast, the User could also select to copy an entire existing VRD or a template VRD with some VRD segments already defined as a starting point for creating a new VRD for a new virtual resource.

As shown in FIG. 3, the virtualization manager has divided the virtual resource definition 310 into a number of VRD segments 312. As used herein, the term VRD segment refers to one or more elements of a virtual resource definition as discussed above. In the illustrated example of FIG. 3, VRD segments for Virtual server Definition 1 include OS Runtime, System Values/Settings, User Registry, Network Configuration, Printer Definitions, Device Drivers, File System, and Applications. Other VRD segments could also be defined. Similarly, VRD segments for a virtual storage device would include size, write protection type, mirroring on/off, etc. Similarly, the virtualization manager divides other virtual resource definitions into appropriate VRD segments.

As described above, the virtualization manager has divided the virtual resource definition 310 into a number of VRD segments 312. In contrast, the new virtual server definition 320 does not yet have any defined VRD segments. The user can select a VRD segment 312 listed in the Virtual Server Definition 1 310 to display the elements for the selected VRD segment. In this example, the user (system administrator) uses a pointing device to select 314 the "System Values/Settings" segment 316 of the virtual server definition 310. The selection by the user can be accomplished in any suitable manner. For example, the user may select the desired VRD segment using a mouse to direct a cursor over the VRD segment and "clicking" the mouse key to make the selection. The selected VRD segment can then be viewed and copied into the new virtual server definition 320 as described below.

FIG. 4 represents the user interface of the virtualization manager as shown in FIG. 3 after the user has selected "System Values/Settings" segment 316 of the virtual server definition 310. In this example, upon selection of the VRD segment 316 the virtualization manager expands the selected segment to show each of the elements 412 in the VRD segment. Each of these elements 412 in the VRD segment or a combination of these elements can be considered sub-segments as discussed further below with reference to FIG. 5. The user is then able to copy the selected VRD segment 316 and paste 416 the copied VRD segment into the new virtual server definition 320. The support of the copy and paste functions in the user interface 123 can be made in any suitable manner, including those know in the prior art.

Figure 5:
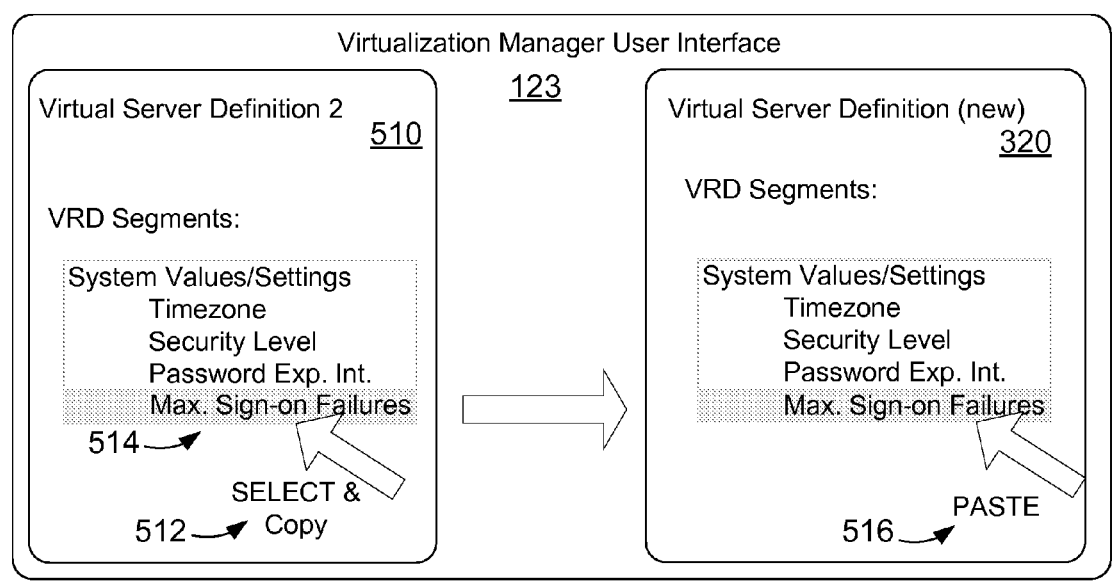
FIG. 5 illustrates an example of creating a virtual resource definition by copying a sub-segment from an existing virtual resource definition.

FIG. 5 represents the user interface of the virtualization manager similar to that shown in FIG. 4. In this example, the user has selected a different existing virtual server definition (Virtual Server Definition 2) 510. The user can then select sub-segments from this virtual server definition to copy to the new virtual server definition 320. In this example, the user selects and copies 512 the "Max. Sign-on Failures" sub-segment 514 and pastes 516 this sub-segment to the new virtual server definition 320. The user interface must determine whether to add or replace when copying the segments or sub-segments. The user interface may always ask the user whether to add or replace. Or, the user interface may assume that the user intends to add the copied segment into the new resource definition if there is not already a corresponding segment in the new virtual resource definition. Then, the user interface would ask the user if the user wants to replace existing segments or sub-segments when the destination resource already has a corresponding segment or sub-segment.

In the described example, the user is able to configure a new virtual resource definition by copying a sub-segment from a second virtual server definition to combine with the VRD segments of the first virtual server definition already copied to the new virtual resource definition. In this way, the user (systems administrator) can configure a new virtual server definition by combining any combination of segments or sub-segments from a number of existing virtual server definitions.

The segments of a virtual resource definition may have elements that reference elements in another segment such that the segments depend on one another. Where dependencies exist between segments, these dependencies must be resolved when segments of the virtual definition are copied as described above. Preferably the virtualization manager gives the user the option of resolving the dependencies or breaking up the dependencies. For example, there may be some dependencies between the User Registry segment of a virtual server definition and the File System segment shown in FIG. 3. For this example, we assume that the user registry and file system segments include elements as follows:

User Registry:
User IDs (collection)
ID-to-Object(s) Mapping
File System
File System Objects (collection)
Object-to-ID(s) Mapping In this example, the user registry contains a collection of user IDs and a mapping of what user IDs are allowed to access the objects. Further, the File system segment specifies a collection of objects, and a mapping of file system objects that users of the system are authorized to access. These mappings between the users and objects are dependencies that need to be removed or replaced when forming the new virtual resource definition. In this case, each dependency could be broken, or resolved. If the User Registry references File System object A then File System object A is a dependent element of segment. Resolving the dependency would mean that either File System object A is copied into the new VRD, or that File System object A is mapped to an object that exists in the new VRD already. Breaking the dependency would mean that the reference to File System object A would be removed from the User Registry, i.e. the authorization information is deleted from the user registry. Another type of dependency is an element mismatch between segments. For example, the User Registry may reference File System objects that do not exist in the new virtual resource definition that the segment is being copied to (because its File System segment does not match the one in the virtual resource definition that the User Registry was copied from). This type of dependency can be handled in the same way. The virtualization manager would allow breaking or resolving dependencies as described herein. In addition to having the capability to work with dependencies directly, the virtualization manager could allow software plug-ins to be used for resolving the dependencies.

In addition to resolving dependencies, the virtualization manager preferably checks resource definitions to determine if they are valid or not. First, the validation step would check to ensure that all the segments compose a complete VRD. A definition is not valid where the minimum VRD segments are not specified. For example, a virtual disk segment may require at least one disk segment. In addition, the validation would check that the VRD combination makes sense. For example, if a "File System" VRD segment contains a first file system type, but the "OS Runtime" VRD segment is of a different type, then the two are incompatible and the VRD segment would not be valid. Similar checks for other types of segments can be made to ensure the VRDs are valid.

Figure 6:
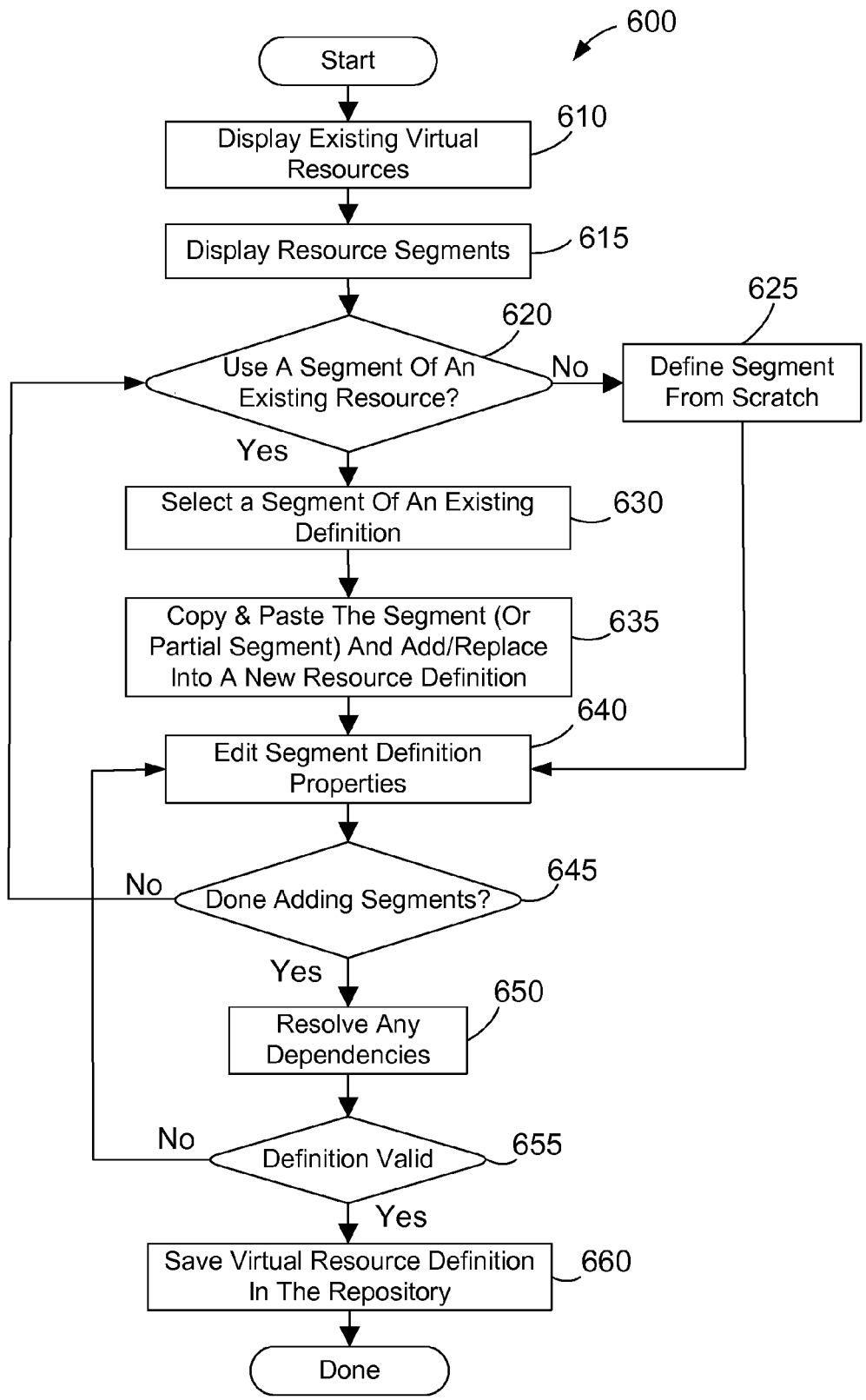
FIG. 6 is a method flow diagram for creating a virtual resource definition using segments from an existing virtual resource definition.

FIG. 6 shows a method 600 for creating a new virtual resource definition by copying segments from an existing virtual resource definition into the new virtual resource definition. The steps in method 600 are preferably performed by the virtualization manager 122 in response to appropriate input from a user via the user interface 123 shown in FIG. 1 to perform the steps as described. First, display an existing virtual resource (step 610). Upon the user selecting a virtual resource, divide the virtual resource definition into a number of resource segments and display to the user (step 620). Allow the user to choose whether to create a new virtual resource definition by selecting segments of an existing virtual resource or by defining segments of the new resource from scratch (step 620). If the user selects to define a segment from scratch (step 620=no) then define the segment from scratch according to the prior art (step 625) and go to step 640. If the user selects to use a segment of an existing resource (step 620=yes) then select a segment of an existing virtual resource definition (step 630). Copy and paste the selected segment from the existing virtual resource definition into a new resource definition or template (step 635). The copy can add the new segment or replace an existing segment. Next, edit the segment definition properties of the newly added segment (step 640). If not done adding segments (step 645=no) then return to step 620. If done adding segments (step 645=yes) then resolve any dependencies (step 650) and check if the new virtual resource definition is valid (step 655). If the definition is not valid (step 655=no) then return to step 640 to edit the definition. If the definition is valid (step 655=yes) then save the virtual resource definition in the repository where it can be used to deploy a virtual resource on a physical resource (step 660). The method 600 is then done.

As described above, a virtualization manager divides a virtual resource definition into a number of reusable segments and allows a systems administrator to copy segments of a virtual resource definition from an existing virtual resource to create a new virtual resource definition. Further, any dependencies in the existing virtual resource are resolved with user input to break the dependencies or copy dependent data. This allows the systems administrator to more efficiently and simply create and manage virtual resources.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
   at least one processor;
   a memory coupled to the at least one processor;
   a repository in the memory containing a plurality of virtual resource definitions that define a virtual resource to allow the virtual resource to be created and deployed on a physical resource;
   a virtualization manager residing in the memory that divides the virtual resource definitions into a plurality of segments and provides a user interface;
   wherein the user interface allows a user to select and copy a segment from a first virtual resource definition and paste the selected segment into a second virtual resource definition; and
   wherein the virtualization manager uses the second virtual resource definition to deploy a virtual resource on a physical resource and allows the user to determine how to resolve dependencies between segments when copying the selected segment into the second virtual resource definition.

2. The apparatus of claim 1 wherein the second virtual resource definition is a new virtual resource definition.

3. The apparatus of claim 1 wherein the second virtual resource definition is an existing virtual resource definition.

4. The apparatus of claim 1 wherein the plurality of segments are further divided into sub-segments that may be selected and copied into the second virtual resource definition.

5. The apparatus of claim 1 wherein virtualization manager resolves a dependency by copying a dependent element with the selected segment into the second virtual resource definition.

6. The apparatus of claim 1 wherein the virtualization manager resolves a dependency by removing a dependent element from the selected segment to be copied into the second virtual resource definition.

7. A computer-implemented method for virtualization management, the method comprising the steps of:
   (A) displaying an existing virtual resource definition as a plurality of segments, where the virtual resource definitions define a virtual resource to allow the virtual resource to be created and deployed on a physical resource;
   (B) allowing a user to select and copy a segment from the plurality of segments;
   (C) pasting the selected segment into a second virtual resource definition;
   (D) using the second virtual resource definition to deploy a virtual resource on a physical resource;
   (E) allowing the user to determine how to resolve dependencies between segments when copying the selected segment into the second virtual resource definition; and
   (F) wherein the method steps are implemented in a computer software program stored in computer memory and executed by a computer processor.

8. The method of claim 7 wherein the second virtual resource definition is a new virtual resource definition.

9. The method of claim 7 wherein the plurality of segments are further divided into sub-segments that may be selected and copied into the second virtual resource definition.

10. The method of claim 7 wherein virtualization manager resolves the dependency by copying a referenced element in the selected segment with the selected segment into the second virtual resource definition.

11. The method of claim 7 wherein the virtualization manager resolves the dependency by removing a dependent element from the selected segment to be copied into the second virtual resource definition.

12. A computer-implemented method for virtualization management, the method comprising the steps of:
   (A) displaying an existing virtual resource definition as a plurality of segments, where the virtual resource definitions define a virtual resource to allow the virtual resource to be created and deployed on a physical resource, wherein the segments contain at least one virtual resource element that is a parameter of a virtual resource associated with a logical resource, and where the segment contains more than one virtual resource element, the at least one virtual resource elements are logically related;

(B) allowing a user to select and copy a segment from the plurality of segments; (C) pasting the selected segment into a second virtual resource definition; and (D) using the second virtual resource definition to deploy a virtual resource on a physical resource;

(E) allowing the user to determine how to resolve dependencies between segments when copying the selected segment into the second virtual resource definition; and (F) wherein the method steps are implemented in a computer software program stored in computer memory and executed by a computer processor.

13. An article of manufacture comprising: a virtualization manager stored on a computer recordable media that when executed by a computer processor performs the steps of:

(A) displaying an existing virtual resource definition as a plurality of segments, where the virtual resource definitions define a virtual resource to allow the virtual resource to be created and deployed on a physical resource;

(B) allowing a user to select and copy a segment from the plurality of segments;

(C) pasting the selected segment into a second virtual resource definition;

(D) using the second virtual resource definition to deploy a virtual resource on a physical resource;

and (E) allowing the user to determine how to resolve dependencies between segments when copying the selected segment into the second virtual resource definition.

14. The article of manufacture of claim 13 wherein the second virtual resource definition is a new virtual resource definition.

15. The article of manufacture of claim 13 wherein the second virtual resource definition is an existing virtual resource definition.

16. The article of manufacture of claim 13 wherein the plurality of segments are further divided into sub-segments that may be selected and copied into the second virtual resource definition.

17. The article of manufacture of claim 13 wherein virtualization manager resolves the dependency by copying a referenced element in the selected segment with the selected segment into the second virtual resource definition.

18. The article of manufacture of claim 13 wherein the virtualization manager resolves the dependency by removing a dependent element from the selected segment to be copied into the second virtual resource definition.

* * * * *